Patented Apr. 9, 1935

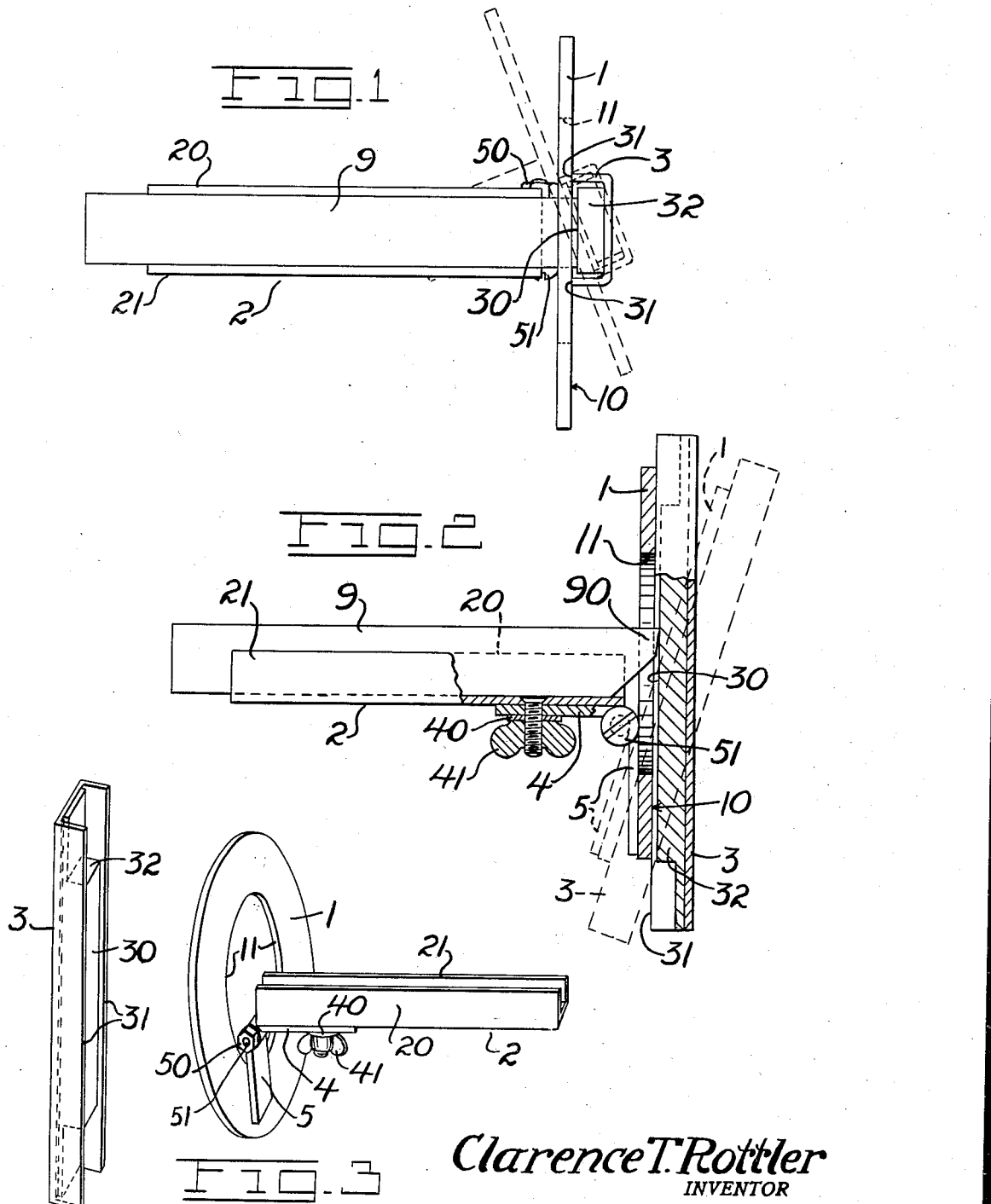

1,997,183

UNITED STATES PATENT OFFICE 1,997,183

SHARPENING TOOL

Clarence T. Rottler, Seattle, Wash.

Application May 21, 1932, Serial No. 612,728

2 Claims. (Cl. 51—220)

My invention relates to the sharpening of tool bits. Tool bits used in machine tools frequently lose their keen, sharp edges, and since they must be true and sharp to fractions of thousandths of an inch, it is necessary to touch them up frequently, even when made of very hard material.

It is an object of my invention, then, to provide a simple tool by which tool bits may be quickly, accurately and conveniently sharpened. It is a further object to provide such a means which will eliminate the probability of any of the abrasive, of which the stone itself may be formed or which may be applied to a finishing or lapping surface of the tool for application to the bit, from coming into contact with the contact surfaces guiding the sharpening tool parts, which surfaces are placed at a definite angular relationship to the edge of the tool. Any such contact of the abrasive would destroy the accuracy of the sharpening tool itself, and therefore would make it sharpen the tool incorrectly or inaccurately.

It is a further object to provide such a tool which is simple and inexpensive in character, adapted to be used either while the tool bit is in place, held in a special holder or held in the hand, and one which is adjustable, if need be, to vary the angle of the point of the machine tool.

My invention comprises the novel tool and the novel method of sharpening a tool bit, as shown in the accompanying drawing, described in this specification, and as will be more particularly defined by the claims which terminate the same.

In the accompanying drawing I have shown my tool, and have illustrated the method of sharpening tool bits.

Figure 1 is a plan view of the tool, parts being shown in operative position.

Figure 2 is a part section and part elevation, likewise showing parts in operative position.

Figure 3 is a perspective view of the two parts of the tool.

Machine tool bits may take various forms, but for purposes of illustration I have shown a straight bar 9 having one end beveled away to form a point or edge 90. This is the working point of the tool, and must be accurately sharpened so that its cutting edge or edges bear a definite relationship to the length of the bit, which in use is held rigidly in a holder, or to the axis or angle of the work against which the bit bears. Unless this very definite relationship of the cutting edge of the bit is maintained, the micrometer adjustments of the tool holder become inaccurate, the positioning of the tool becomes a matter of guess work, and exact reproduction of a part is impossible. Moreover, unless the various angles are correct, the bit will not do its work properly, and a rough finish or uneven surface is the result.

In effect, my invention comprises three elements—a plate 1, a member 2 associated with the plate and adapted to engage the bit 9, and to hold it in definite relationship to the working surface 10 of the plate, and a member, generally designated by the numeral 3, having an abrasive-bearing surface 30 or being in itself abrasive in character.

When the edge to be supplied to the tool bit 9 is to be straight, the plate 1 may conveniently take the form of a disk, circular or of any other convenient shape, the surface 10 of which is plane. Preferably the disk is apertured in its central portion, as indicated at 11. This aperture is of a size to permit any ordinary tool bit to be projected through it.

The function of the member 2 is to engage the tool bit, and to support the disk 1 so that a bit 9 held in or engaged by the member 2 is held in definite relationship to the plane of the surface 10. Thus the member 2 may be formed as an angular member having one or two flanges 20 and 21 against one or both of which the sides of the bit 9 may be fitted as a gauge.

The manner of support of the plate or disk 1 from the member 2 is immaterial. If a certain angle is desirable for a large amount of sharpening, the connection may be a rigid one at the desired angle. If the tool is designed for sharpening at different angles, the connection may be adjustable, and preferably it is adjustable in two directions along axes both of which are at right angles to each other and to the length of the bit 9. Thus, as is best seen in Figure 2, a strap 4 is pivotally connected by the bolt 40 and wing nut 41 to the under side of the member 2, and a second strap 5, secured to the disk 1, is pivotally connected by the nut 50 and clamping screw 51 to the strap 4. Adjustment may be accomplished in the manner indicated by the dash lines in Figures 1 and 2.

The member 3 has certain elements, spaced from each other, which jointly define a plane surface which is complemental to the surface 10 of the disk 1, and which, when in engagement with the surface 10, hold the abrasive-bearing surface 30 away from the surface 10. The abrasive-bearing surface must not come in direct contact with the plate, and preferably it does not come in direct contact with those elements which bear upon the plate. The object of this, of course, is to prevent abrasive getting between the relatively movable parts, and thus, by wearing away the bearing elements or the plate, to destroy the accuracy of the tool.

These results can conveniently and cheaply be accomplished by forming the member 3 of channel shape, so that the edges 31 of its side flanges define a plane and bear upon the surface 10 of the disk. The abrasive-bearing surface may be formed upon a bar 32, of cast iron, for instance, the surface of which is parallel to the plane defined by the edges 31. The sides of the bar 32 are spaced from the flanges of the channel-shaped member 3, as is best seen in Figure 1.

As has already been mentioned, the bar 32 may itself be of abrasive material. It may be of stone, for instance, but if it is intended to receive one of the harder abrasives—boron carbide, for instance, which is employed for sharpening tool bits of hard material, such as tungsten carbide, for instance—it will usually be of cast iron. When such an abrasive is employed it may be applied to the surface 30 in any suitable manner, for instance, by applying olive oil to the surface 30 and then spreading the abrasive powder thereon. Care is taken to keep the oil and the abrasive, the latter at least, from the edges 31 and, of course, from the surface 10. The spacing of the bar 32 from the flanges of the channel 3 facilitates this.

The disk having been now adjusted to the proper angle with relation to the length of the bit 9, and the bit having been properly applied to the member 2 and projected slightly through the aperture in the disk, the member 3 is engaged with the surface 10 and its surface 30 with the point of the tool. The member 3 is now moved relatively to the bit in a manner common in grinding or lapping devices, and gauged by the contact between the surfaces 31 and 10, the point of the bit is quickly, conveniently and very accurately sharpened. Its angle, of course, will depend upon the angle at which the disk has been set with respect to the channel 2.

It is evident that it is immaterial whether the bit 9 be held in some manner and the sharpening tool applied thereto, or whether the bit be removed from any holder and be applied within the sharpening tool and held by hand.

What I claim as my invention is:

1. A tool for sharpening machine tool bits comprising an apertured contact plate, means associated therewith for engaging the bit so that the point of the latter projects through the aperture, and to maintain the bit in definite angular relationship to that surface of the plate past which the edge of the bit projects, a complemental means having elements adapted to bear upon and move over such surface of the plate, and having an abrasive-bearing surface recessed within the plate-engaging elements to engage the projecting edge of the bit, and to be held from contact with the plate's surface, and means to fix the bit-engaging means in any desired angular relationship relative to the plate's surface.

2. A tool for sharpening machine tool bits comprising an apertured contact plate, means associated therewith for engaging the bit so that the point of the latter projects through the aperture, and to hold the bit in definite relationship to that surface of the plate past which the edge of the bit projects, a complemental means having elements adapted to bear upon and move over such surface of the plate, and having an abrasive-bearing surface recessed within the plate-engaging elements to engage the projecting edge of the bit, and to be held from contact with the plate's surface, and means to permit movement of the bit-engaging means into any desired angular position relative to the plate's surface, about axes at right angles to each other and to the length of the bit, and to fix the same in such position.

CLARENCE T. ROTTLER.